United States Patent [19]

Bell

[11] 3,810,175

[45] May 7, 1974

[54] ALONG TRACK TERRAIN AVOIDANCE CONTOURING SYSTEM

[75] Inventor: William H. Bell, Los Angeles, Calif.

[73] Assignee: Hughes Aircraft Company, Culver City, Calif.

[22] Filed: Jan. 17, 1972

[21] Appl. No.: 218,217

[52] U.S. Cl. .............................. 343/7 TA, 343/5 EM
[51] Int. Cl. .......................... G01s 9/06, G01s 9/52
[58] Field of Search ................ 343/7 TA, 7.3, 5 EM

[56] References Cited
UNITED STATES PATENTS

| | | | |
|---|---|---|---|
| 3,713,147 | 1/1973 | Chanzit | 343/7 TA |
| 3,740,750 | 6/1973 | Moulton | 343/7 TA |
| 3,369,231 | 2/1968 | Foral | 343/7 TA |
| 3,212,088 | 10/1965 | Alexander et al. | 343/7 TA |
| 3,396,391 | 8/1968 | Anderson et al. | 343/7 TA |
| 3,519,876 | 7/1970 | Murray | 315/22 |
| 3,573,786 | 4/1971 | Schira | 315/22 |
| 3,397,397 | 8/1968 | Barney | 343/7 TA |
| 3,188,632 | 6/1965 | Jeromson | 343/7 TA |

Primary Examiner—Maynard R. Wilbur
Assistant Examiner—H. A. Birmiel
Attorney, Agent, or Firm—W. H. MacAllister, Jr.; Walter J. Adam

[57] ABSTRACT

A terrain clearance or following system that provides terrain clearance information in depth from large elevation depression angles out along the projected aircraft ground track to the horizon. The aircraft projected ground track is displayed on a cathode ray tube by a heavy along track line and the intersection of the aircraft velocity vector with the terrain is displayed by the intersection of the along track line and a flight path reference line. The range to the top of a first hill is displayed at the end of a first segment of the along track line and the distance across the valley between first and second hills is displayed as a blank space between the first and a second segment of the along track line. The range to the top of succeeding hills is displayed by additional segments of the along track line. This system operates with simultaneous display of a radar line of sight range line and a terrain clearance reference line representing an imaginary clearance plane at a selected distance below the aircraft. A down look reference line representing the range to the clearance plane at the maximum depression angle may also be displayed.

4 Claims, 8 Drawing Figures

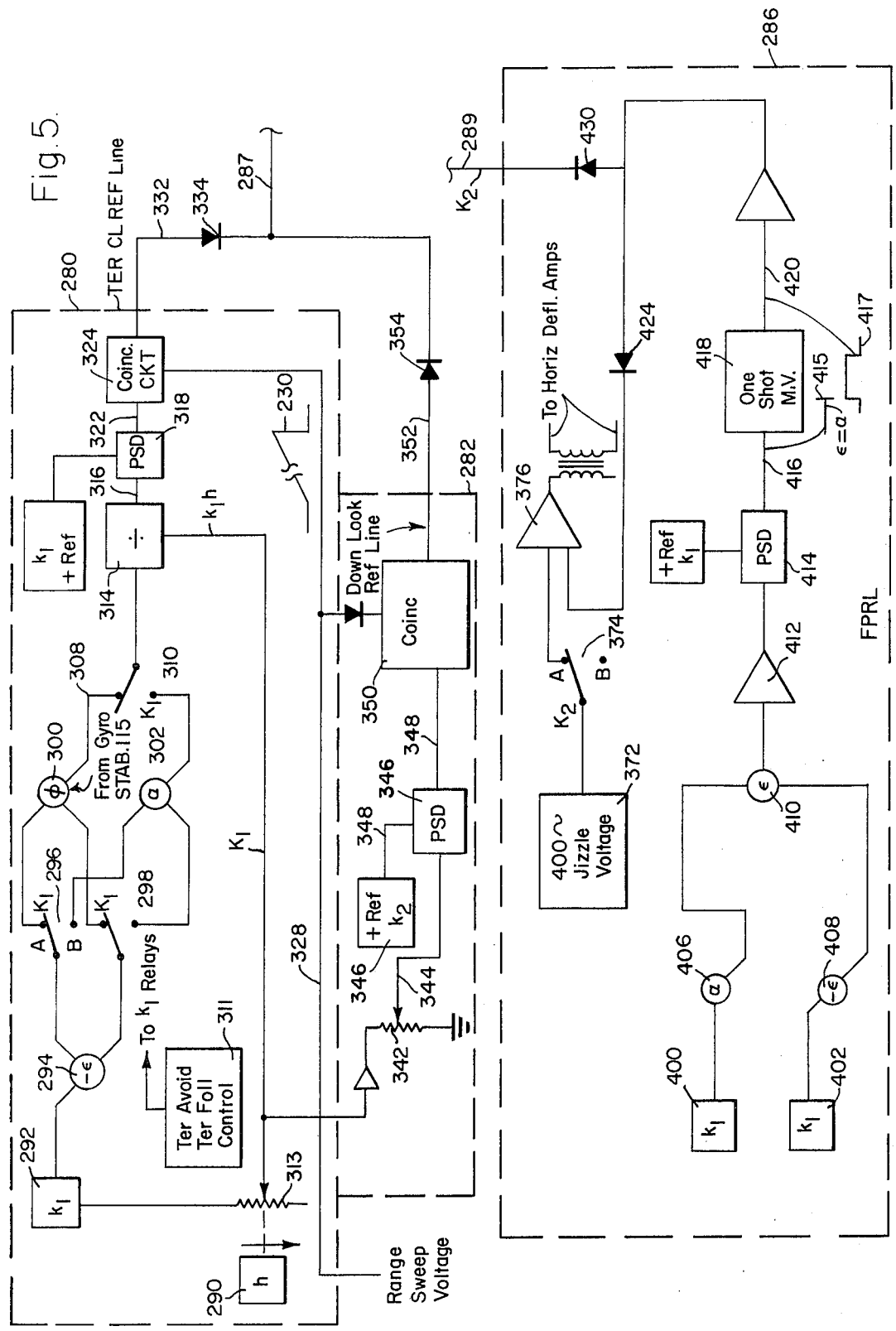

ALONG TRACK TERRAIN AVOIDANCE CONTOURING SYSTEM

BACKGROUND OF THE INVENTION

1. Field of the Invention

This invention relates to radar obstacle clearance systems and particularly to an along track terrain avoidance contouring system that provides the pilot with a displayed along track contour from a relatively large down look angle out to the horizon.

2. Description of the Prior Art

A terrain clearance system as taught in U.S. Pat. No. 3,188,632, "Obstacle Clearing System" by George Jeromson, provides terrain clearance in azimuth at a single depression angle. In this prior art system, the radar antenna is programmed in a single bar azimuth scan with a depression angle E held at a fixed angle below either the local horizontal (terrain avoidance) or below the flight path (terrain following). The radar line of sight range to the ground is continuously displayed by a range gate which is superimposed over the sector PPI (plan position indicator) ground map display. A reference range arc is also superimposed over the radar ground map display, computed such as to represent the radar range to an imaginary clearance plane. The vertical distance h of this imaginary clearance plane below the aircraft is the desired terrain clearance as selected by the pilot. In the terrain following mode, the clearance plane follows the aircraft velocity vector and in the terrain avoidance mode, the clearance plane is stabilized to the horizontal. Thus if the aircraft is flying at an altitude h above a flat terrain, the radar line of sight to the terrain as displayed by the LOS range gate is an arc on the sector PPI radar ground map display which would be coincidental with the reference range arc. The radar LOS arc or line increases in range as the aircraft climbs to altitudes above the terrain greater than h and decreases below the reference line when the aircraft altitude decreases below the terrain clearance setting h. This prior art system would be further improved if terrain contour information were also provided from along the extended track line of the aircraft to large elevation depression angles. It would be a substantial improvement in these obstacle clearance systems if they were able to provide both azimuth and along track information simultaneously.

SUMMARY OF THE INVENTION

In the along track terrain avoidance contouring system (ATTAC) in accordance with the invention, the antenna is programmed through three single bar azimuth scan cycles, for example, and then through one cycle in elevation from the desired depression angle up to a desired angle above the velocity vector of the aircraft. The azimuth terrain clearance display resulting from the horizontal sweeps is retained during the along track elevation sweep and the line of sight (LOS) range gate is superimposed over the stored display during the elevation sweep of the antenna. During this along track elevation sweep of the antenna, the antenna is held in azimuth at the computed aircraft crab angle so that the radar sweeps along the projected aircraft ground velocity vector. The result of the system of the invention is a displayed heavy along track line starting at the radar line of sight range corresponding to the selected depression angle and extending in range along the projected ground track (except for discontinuities) to the horizon where it stops. Terrain irregularities along the track will be displayed as discontinuities in the projected along track line so that the along track line may be formed of a plurality of segments. Displayed along track segments will terminate at the tangent range to the peaks of the hills followed by a blank space to the range of the intersection with the next terrain or hill. A short reference arc is provided at a range computed from the intersection of the maximum antenna depression angle and an imaginary reference plane. A short flight path reference line (FPRL) is also displayed at a range where the antenna elevation angle is coincidental with the aircraft flight path. All terrain information above the FPRL is above the aircraft flight path while that below the FPRL is below the aircraft flight path. The intersection of the FPRL line and the on track line represents the collision impact range with the terrain in the event that no evasive maneuvers are made. The pilot will, of course, change his flight path by following the terrain clearance line and as he does so the FPRL will move up or down the display accordingly.

It is therefore an object of this invention to provide an improved aircraft clearance display system.

It is a further object of this invention to provide terrain clearance information to an aircraft pilot of terrain along the projected flight path of the aircraft.

It is a further object of this invention to provide an aircraft system developing terrain clearance information in depth from large elevation depression angles out along the aircraft projected ground track to the horizon.

It is a further object of this invention to provide an improved terrain clearance system that provides both azimuth and along track information simultaneously so as to enable the pilot to follow the contour of hills and valley of the forward terrain.

BRIEF DESCRIPTION OF THE DRAWINGS

These and other objects, features and advantages of the invention itself, will become apparent to those skilled in the art in the light of the following detailed description taken in consideration with the accompanying drawings wherein like reference numerals indicate like corresponding parts throughout the several parts wherein:

FIG. 5 is a schematic circuit and block diagram showing an additional portion of the terrain avoidance contouring system of FIGS. 3 and 4 in accordance with the invention;

DESCRIPTION OF THE PREFERRED EMBODIMENT

Figure 1:
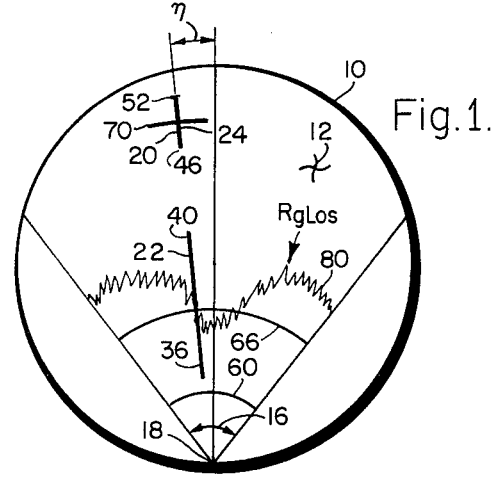
FIG. 1 is a diagram of the screen of a display tube or display unit as used in the terrain avoidance contouring system in accordance with the invention for explaining the operation thereof.

A display surface 10 is shown in FIG. 1 which may be the screen of a cathode ray tube and may have a map indicated at 12 superimposed thereon either electronically through the cathode ray tube or by other optical projection schemes as are well known in the art. Because the display is a sector plan position indicator (PPI) type of display, the displayed area is included in an azimuth angle 16 with range projecting from a point 18 over the entire azimuth angle. The aircraft projected ground track is displayed by the direction of an along track terrain avoidance contouring (ATTAC) line 20 which will be called the along track line, including segments 22 and 24, for example.

Figure 2:
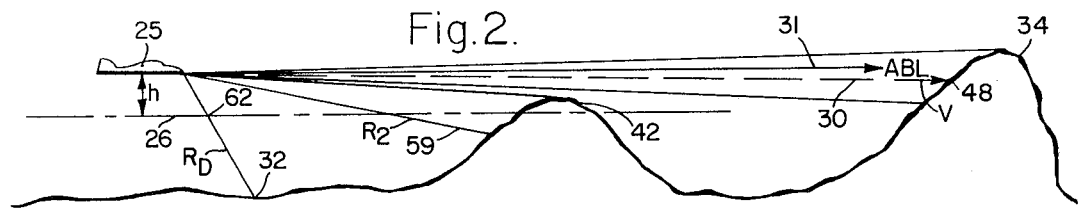
FIG. 2 is a schematic elevation view of a craft in flight for explaining the terrain avoidance contouring operation in accordance with the invention.

Referring also to FIG. 2, an aircraft 25 is shown above a clearance plane 26 having a velocity vector 30, an aircraft ballistic line (ABL) or longitudinal axis 31, and an elevation scan angle from a point 32 which may be 45° below the ABL line 31 to a point 34 and up to +15° above the ABL line 31. A point 36 of the segment 22 of the along track line 20 which is the start of that line indicates the slant range to the terrain at the point 32 along a depressed −45° radar line of sight line, for example. The end of the first segment 22 at a point 40 indicates the slant range along the ground track line to the top of the first hill at a point 42. The start of a second segment 24 of the along track line 20 at a point 46 indicates the slant range to the tangent intercept with the second hill at a point 48. The range between the points 40 and 46 on the display indicates the distance across the valley between the point 42 at the peak of the first hill and the point 48 where the second hill is intercepted by the radar pulse. A point 52 on the display which is the end of the second segment 24 of the along track line 20 indicates the slant range along the track to the top of the first hill at a point 34. It is to be noted that additional segments may be shown on the display when additional hills are present to reflect energy along the line of sight to the aircraft's radar system.

A line 60 which is called the ATTAC reference line represents the range $R_D$ along the −45° line of sight to the clearance plane 26 at a point 62, which shows the aircraft terrain clearance relative to the clearance plane at this selected maximum depression angle. A terrain clearance reference line 66 shows the range along the single bar scan of the antenna to the clearance plane 26 along a line 59 which is at a selected depression angle of −20°, for example, below the ABL line 31, during the azimuth scan period. A line 80 which is the radar line of sight range from the azimuth scans of line 59 indicates to the pilot the line of sight range of the radar for comparison with the terrain clearance reference line 66. A line 70 which is a flight path reference line (FPRL) shows the intersection of the aircraft velocity vector V of the line 30 with the terrain at the point 48, at the intersection of the along track line 20 and the flight path reference line 70. It is to be noted that the intersection of the line 70 and the along track line 20 is the impact point of the aircraft if the pilot does not change his course in response to the radar line of sight range indication 80. The radar line of sight line 80 along the line 59 which is the range, increases in distance from the point 18 (range) greater than the reference line 66 as the aircraft climbs to altitudes above the terrain greater than $h$ and decreases below the reference line 66 when the aircraft altitude is decreased below the terrain clearance setting $h$. In FIG. 2, the aircraft 25 is flying with a horizontal velocity vector so that the clearance plane 26 and the azimuth scan line 59 are the same as illustrated for both terrain avoidance and terrain following operation.

Figure 3:
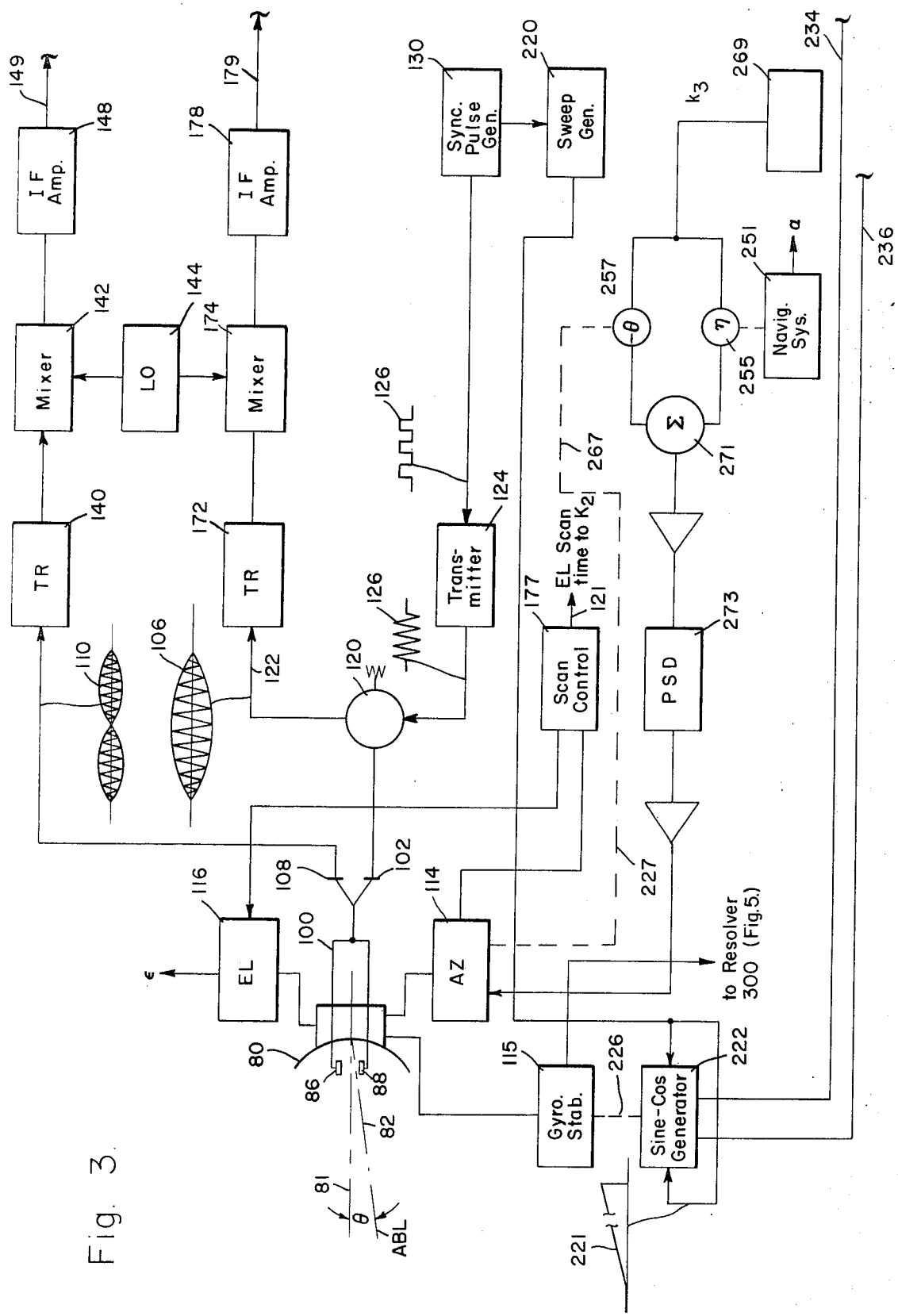
FIGS. 3 and 4 are schematic circuit and block diagrams showing an illustration embodiment of a portion of the terrain avoidance contouring system in accordance with the invention.
Figure 4:
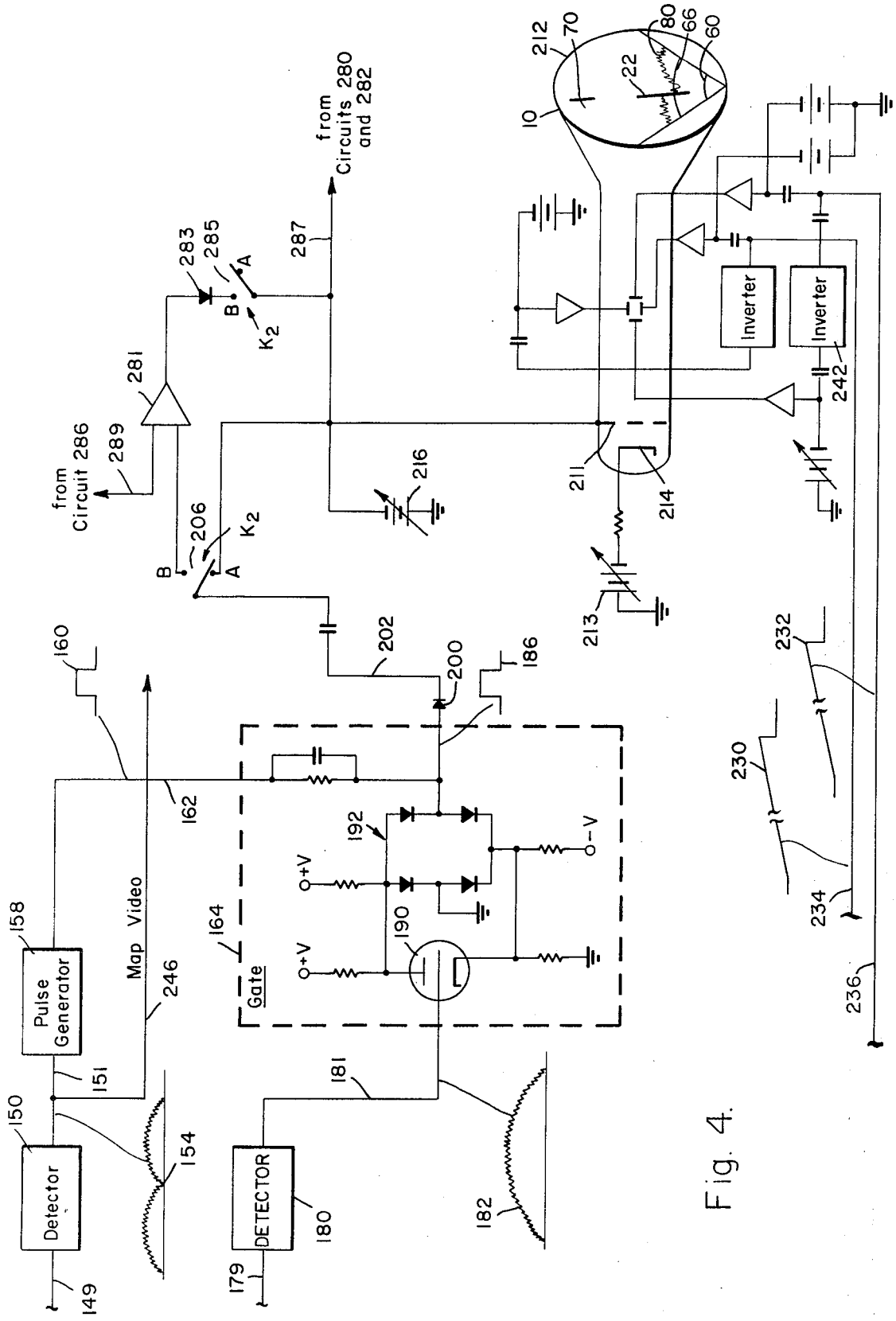

Referring now to FIGS. 3 and 4, the system in accordance with the invention for providing the display of FIG. 1 will be further explained. A monopulse antenna 80 has a radar line of sight axis 81 that scans horizontally through an azimuth sweep angle $\theta$ that is both positive and negative relative to an aircraft longitudinal axis or aircraft ballistic line (ABL) 82. The antenna 80 also has an elevation scan to provide the contouring display system in accordance with the invention. Operation of the antenna 80 is in the monopulse mode in elevation with two horns 86 and 88 vertical to each other in an elevation plane. It is to be understood that the principles of the invention are not limited to horns or to any particular type array but that any suitable type such as a dish having slots to receive the energy may be utilized. The horns 86 and 88 apply intercepted RF (radio frequency) energy to branches of a magic T structure 100 for energy division. Energy received by the structure 100 is applied to a junction 102 as an elevation sum signal indicated by a waveform 106 and to a junction 108 as an elevation difference signal indicated by a waveform 110.

The antenna 80 is controlled in its azimuth scan by an azimuth scan motor 114 and in its elevation scan by an elevation scan motor 116. The antenna 80 may be fixed at a constant depression angle below the axis of the craft during its azimuth scan for one mode (terrain following) of operation, and in another mode (terrain avoidance) of operation may be maintained at a constant depression angle below the horizontal by a gyro stabilizer 115, as is well known in the art, mounted to the structure of the antenna 80.

Figure 6:
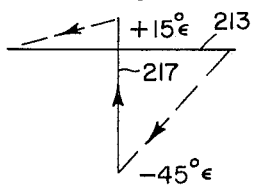
FIG. 6 is a schematic diagram showing the antenna scan pattern that may be utilized in the system of the invention.

Referring temporarily to FIG. 6, the antenna scan pattern for the azimuth scan is shown by a line 213 and for the vertical scan is shown by a line 217. Although any suitable number of azimuth scans may be provided, the illustrated arrangement may have three azimuth scans followed by one elevation scan. This sequence as determined by a scan control unit 177 (FIG. 3) starting at the left may be as follows:

1 — Left to right
2 — Right to left
3 — Left to right
4 — −45° below the ABL line down look up to +15° up look above the ABL line
5 — Repeat from 1.

Referring back to FIGS. 3 and 4, the scan control unit 177 which may include relays or suitable blocking oscillators controls the azimuth and elevation scan sequence and may provide A and B timing signals on a lead 121 respectively representing azimuth and elevation scan times. The junction 102 is coupled to a circulator 120, which as is well known in the art, applies the sum signal of the waveform 106 to an adjacent lead 122. Prior to reception of energy, a transmitter 124 applies pulses of energy of a waveform 126 to another input port of the circulator 120 for being applied with minimum attenuation to the port 102 of the magic T structure 100. The pulses of energy are then applied through the magic T structure and to the horns 86 and 88 without a phase shift for transmission into space. The transmitter 124 is controlled by synchronizing pulses of the waveform 126 having a selected pulse repetition frequency (PRF) and applied thereto from a synchronizing pulse generator 130.

The difference signal of the waveform 110 is applied from the junction 108 through a transmit receive or TR box 140 that functions as an antenna duplexer as is well known in the art, to a mixer 142. A local oscillator 144 is coupled to the mixer 142 to heterodyne the RF energy of the waveform 30 to an IF frequency signal which is then applied through an IF amplifier 148 through a lead 149 to an amplitude detector circuit 150.

A rectified envelope signal of a waveform 152 is developed by the detector 150 and has a null time 154 at which time the signal falls to a threshold or reference level representing the time of energy return on the boresight axis 81 of the antenna 80. The video difference signal of the waveform 152 is then applied to a pulse generator 158 which responds at the null time 154 to develop a pulse shown by a waveform 160 which is then applied through a lead 162 to a coincidence gate 164.

The sum signal indicated by the waveform 106 at radio frequency is applied from the lead 122 to a TR box 172 and in turn to a mixer 174 also coupled to the local oscillator 144. The heterodyned signal is then applied from the mixer 174 through an IF amplifier 178 and through a lead 179 to an amplitude detector circuit 180 which develops on a lead 181 a rectified envelope or video sum signal indicated by a waveform 182.

Energy is returned on the boresight axis 81 of the antenna 80 at the time when the video difference signal of the waveform 152 is at the null time 154 to develop a pulse of the waveform 160 and when the video sum signal of the waveform 182 has a substantially large amplitude. The gate 164 responds to the condition of the appearance of the pulse of the waveform 160 simultaneously with the presence of a sum signal above a selected reference amplitude to apply a pulse of a waveform 186 to a control lead 188. The gate 164 includes a tube 190 having its grid coupled to the lead 181 and being suitably biased to be normally nonconductive. A diode switching arrangement 192 is suitably coupled to the tube 190 to prevent signals on the lead 162 from passing to the lead 188 except when the tube 190 is biased into conduction and a pulse is applied to the diode switch 192 from the lead 162. Various types of coincident gating arrangements including the illustrated gate may be utilized, that are well known in the art, and the gate 164 will not be explained in further detail. The range pulse of the waveform 186 whose time of occurrence indicates the antenna boresight range is applied through an isolating diode 200 to a lead 202 and through a coupling capacitor to a $K_2$ switch 206 which is in the A position during the azimuth antenna scan and is in the B position during the elevation scan. The A terminal of the switch 206 is coupled to an intensity grid 211 of a cathode ray tube (CRT) 212 which may have the screen 10 as explained relative to FIG. 1.

The tube 212 has a cathode 214 coupled through a variable resistor to the negative terminal of a negative voltage source such as a variable battery 213, the positive terminal of which may be coupled to ground. The control grid or intensity grid 211 for providing adjustable DC biasing may be coupled to a suitable biasing arrangement such as the negative terminal of a variable battery 216, the positive terminal of which is coupled to ground.

For providing sweep signals to the display tube 212 a sweep generator 220 responds to the synchronizing pulse generator 130 to apply a sweep signal of a waveform 221 to a sine cosine generator 222. The azimuth scan movement of the antenna 80 through the scan angle $+$ and $-\theta$ is translated from the gyro stabilizer 115, for example, through a suitable mechanical connection 226 to the sine consine generator 222 and the elevation and azimuth sweep signals shown by respective waveforms 230 and 232 are developed on respective leads 234 and 236. The sweep signals which represent a product of the linear sweep voltage of the waveform 221 respectively with the cosine and sine of $\theta$ and $\epsilon$ (from elevation motor 116) during the azimuth and elevation sweeps, controls the display screen 10 in sequence with the elevation and azimuth scans. In one arrangement of connecting the deflection plates, inverters 240 and 242 and suitable deflection amplifiers as are well known in the art, are provided. It is to be understood that other deflection arrangements such as magnetic deflection yokes may be utilized within the scope of the invention.

Figure 7:
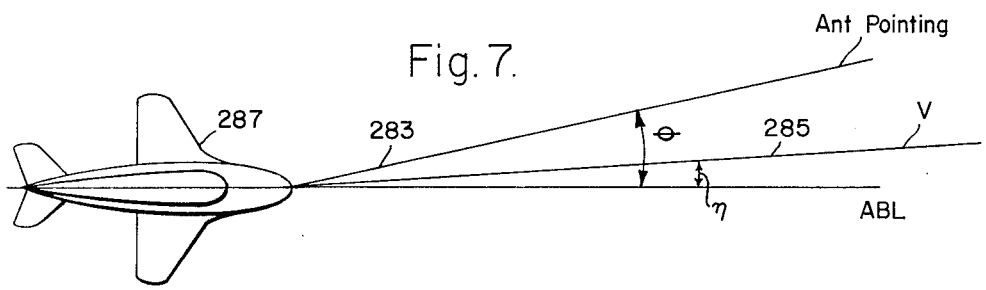
FIG. 7 is a schematic plan view of an aircraft in flight for explaining the crab angle correction utilized in the display system of the invention.

In order that the antenna scan in elevation along the aircraft velocity vector a control system is provided including an $\eta$ or crab angle resolver 255 responsive to a navigation system 251 and a $-\theta$ or azimuth antenna pointing angle resolver 257 responsive to feedback from the azimuth motor 114 on a mechanical connection 267. The resolvers 255 and 257 receive a suitable AC voltage $k_2$ from a source 269, which voltage may be at 400 Hz, for example. A summer 271 responds to the gyros 255 and 257 to generate a difference signal which is passed through a phase sensitive detector 273 to develop an error signal when the antenna pointing angle is not equal to the crab angle to drive the antenna pointing angle to zero by applying the error signal through a lead 277 to the azimuth motor 114. The top view of FIG. 7 shows the relationship of the crab angle $\eta$ and the antenna azimuth pointing angle $\theta$. By controlling the azimuth motor so that the azimuth scan is orthogonal to the velocity vector, the elevation scan is along the aircraft velocity vector. As a result, the display as is shown in FIG. 1 has the along track line 20 at an agnle $\eta$ from the vertical of the display. The crab angle correcting system shown in FIG. 3 is for zero roll angle or if a roll angle is present, with a third gimbal utilized with the antenna or with time shared gimbals.

Referring back to the display portion of FIGS. 3 and 4, a radar ground map may be formed in some arrangements utilizing the contouring system of the invention with video signals on a lead 246 operating with a conventional deflection control (not shown) which may be time shared with the other display functions as is well known in the art.

The signal on the lead 202 is applied through a coupling capacitor and the $K_2$ switch 206 to the intensity grid 211. The A terminal of the switch 206 is the signal path during antenna azimuth scan and the B terminal is the signal path scan during vertical antenna scan. The B terminal of the switch 206 is coupled to an amplifier 281, which passes a signal through an isolating diode 283 and a $K_2$ switch 285 when in the B position to apply a signal to the intensity grid 211. The $K_2$ switches are only closed in the A position during a time when the azimuth sweep is occurring and is controlled by the timing signal on a lead 121 from the scan control circuit 117. A lead 287 from circuits 280 and 282 of FIG. 5 is coupled to the intensity grid 211 and a lead 289 from a circuit 286 of FIG. 5 is coupled as an input to the amplifier 281.

Referring now principally to FIG. 5, the generation of other symbols controlling the intensity grid 211 includes the terrain clearance reference line circuit 280, a down look reference line circuit 282 and a flight path reference line (FPRL) circuit 286. The terrain clearance reference line 66 of FIG. 1 has a range selected by manual or automatic selection of the desired clearance plane h in a unit 290. As may be seen in FIG. 8, the range $R_\phi$ for terrain avoidance operation is a function of the angle $\epsilon - \phi$ so that $R_\phi = h/\sin(\epsilon - \phi)$ and the range $R_\alpha$ for terrain following operation is a function of the angle $\epsilon - \alpha$ so that $R_\alpha = h/\sin(\epsilon - \alpha)$. In another form for terrain avoidance operation $R_\phi = -k_1 (\cos \epsilon \sin \phi - k_1 \sin \epsilon \cos \phi)$ and for terrain following operation, $R_\alpha = k_1 (\cos \epsilon \sin \alpha - k_1 \sin \epsilon \cos \alpha)$. The constant amplitude AC signal $k_1$ is applied through a $-\epsilon$ resolver 294, in turn through $k_1$ switches 296 and 298 to a $\phi$ resolver 300 and an $\alpha$ resolver 302. When the switches 296 and 298 are in their A or terrain avoidance positions, the cosine and the sine of $-\epsilon$ are applied to the $\phi$ resolver 200 to provide the term $k_1 \cos \epsilon \sin \phi - k_1 \sin \epsilon \cos \phi$ on a lead 308. When the switches 296 and 298 are in their B or terrain following positions, signals from the resolver 294 are applied to the alpha resolver 302 to generate the signal $k_1 \cos \epsilon \sin \alpha - k_1 \sin \epsilon \cos \alpha$ on a lead 310. A terrain avoidance − terrain following switch 311, which may be pilot controlled, controls the switches 296, 298, 308 and 310 to be in the A position for terrain avoidance and in the B position for terrain following. These two terms on the leads 308 and 310 depending whether terrain avoidance operation of the position A is being utilized or terrain following of position B is being utilized, are applied to a divider circuit 314 responsive to $k_1h$ from a potentiometer 313 so that on a lead 316 the term $h/\sin \epsilon \cos \phi - \sin \phi \cos \epsilon$ for terrain avoidance or the term $h/\sin \alpha \cos \epsilon - \sin \epsilon \cos \alpha$ for terrain following is provided and applied to a phase sensitive detector 318 to develop a DC voltage proportionate to $h$ on a lead 322. The detector 318 receives a suitable positive reference signal having the frequency of $k_1$. A coincidence circuit 324 responds to the $h$ signal on the lead 322 and the range sweep voltage on a lead 328 as indicated by the waveform 230, to apply a pulse upon coincidence to a lead 332 for forming the terrain clearance reference line 66 in the azimuth sweep operation. The pulse on the lead 332 is applied through an isolating diode 334 to the lead 287 and to the intensity grid 211 of the tube 212 to generate the terrain clearance reference line 66. A gyro stabilizer signal is applied to the resolver 300 to correct the signals for the vertical aircraft angle during terrain following operation.

Figure 8:
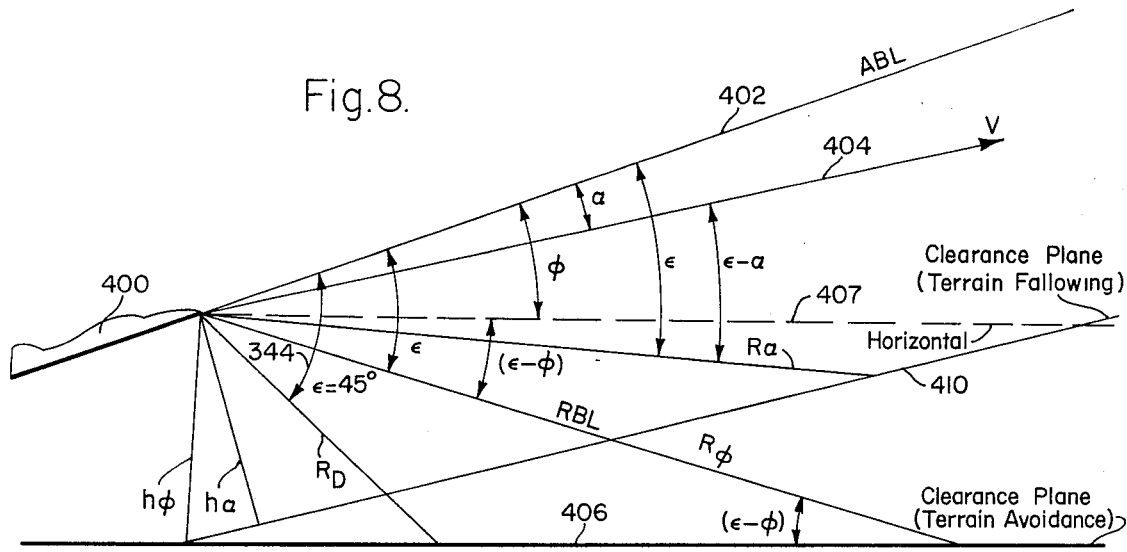
FIG. 8 is a schematic elevation diagram of an aircraft in flight for further explaining the operation of the system of the invention.

The down look reference line 60, FIG. 1, occurs when $\epsilon$ is $-45°$, for example, as shown by an angle 344 as can be seen in FIG. 8. The $h\phi$ and $h\alpha$ values are the heights to the clearance planes respectively for terrain avoidance and for terrain following operation. In the illustration of FIG. 8, with the aircraft in the same angle for both types of operation, the range $R_D$ at the maximum depression angle of 45° is shown to have different values because of different values of $h$. The circuit 282 responds through a suitable potentiometer arrangement 342 that receives the signal $k_1h$ to apply an AC signal of amplitude value $0.707h$ to a lead 344. The range $R_D$ is equal to h over sin of 45° which equals $0.707h$. The AC signal on the lead 344 is applied through a phase sensitive detector 346 also receiving a suitable reference signal of frequency $k_1$ to apply the envelope or detected voltage to a lead 348 in turn applied to a coincidence circuit 350 which at a coincidence of the range sweep on the lead 328 of the waveform 230 and the detected voltage applies a gate pulse to a lead 352. The signal on the lead 352 is used as a synthetic video signal during azimuth scan of the antenna as well as during the elevation scan for controlling the intensity grid of the cathode ray tube 212. The signal on the lead 352 is applied through an isolating diode 354 to the lead 287 to control the intensity grid during azimuth scan of the antenna and develop the down look reference line 60 which is retained during the elevation antenna scan.

The radar line of sight range of the line 80 (FIG. 1) is provided by a synthetic gate signal provided by the coincidence gate circuit 164 of FIG. 4 during the azimuth scans, the same synthetic signal being used during the vertical scan to form the along track line 20.

For formation of the along track gate and referring principally to FIGS. 3, 4, 5 and 7, the navigation subsystem 251 applies a crab angle $\eta$ to resolver 255 which applies a signal through the summer 271 in conjunction with a signal from the resolver 257 which is a function of the azimuth 114 motor position. The signal provided by the summer 271 which is $k_2 [\sin \eta - \sin \theta]$ is applied through a suitable amplifier to a phase sensitive detector 273 which develops an error signal when $\eta - \theta$ is other than 0 to control the azimuth motor 114. The azimuth motor feedback signal on the connection 267 is $-k_2 \sin \theta$ so that the circuit maintains the antenna pointing direction of a line 283 as may be seen in FIG. 7 coincident with the velocity vector of a lead 285 of an aircraft 287 shown in a top view. Thus, the antenna follows the velocity vector on the ground and the along track line has an angle from the vertical on the display 10 representative of the crab angle $\eta$.

Referring now principally to FIG. 5, the along track gate is written on the CRT by a synthetic video signal derived from the gate 164 (FIG. 4) which is a radar line of sight range gate and an AC source 372 applies a jizzle voltage through a $k_2$ switch 374 when in the B or elevation scan position. An amplifier 376 is coupled to the switch 374 and applies the jizzle voltage through a suitable transformer to the horizontal or azimuth deflection plates of the tube 212 (FIG. 4). This jizzle voltage insures that the ATTAC or along track line as well as the flight path reference line will have a sufficient width and contrast to be distinguishable on the display 10. At the same time, the switch 206 of FIG. 4 during the vertical sweep of the antenna is in the B position so that the radar line of sight gate signal is applied through an amplifier 281, an isolating diode 283 and a gate 285 to the CRT intensity grid lead 211. The synthetic video signal of the waveform 186 may consist of a range gate 1 microsecond in length, for example, and at a variable range coinciding with the range along the radar line of sight to the ground. At maximum down look angle assumed to be 45°, the along track line starts at the corresponding line of sight range and continues to be displayed at increasing ranges as the antenna scans up in elevation. The start of the along track line would be coincident with the down look reference line if the terrain were flat and the aircraft were at that time exactly $h$ feet above the terrain. The start of the along track line would be further or closer in range with respect to the down look reference line depending on whether the aircraft is higher above the terrain than $h$ feet or lower than $h$ feet respectively. The along track gate line 20 continues in range until the antenna line of sight becomes coincident with the top of a hill and at that instance the range gate jumps in range to the range corresponding to the line of sight intersection of the next hill. The end of the along track gate line 20 corresponds to the range to the summit of the hill and the end of the second segment 24 of the along track gate line 20 corresponds to the range to the summit of the second hill. The space between the end of the first line and the end of the second line is the distance across the valley between the two hills as shown in FIG. 2.

For forming the flight path reference line 70 (FIG. 1) the constant AC voltages $k_1$ are applied from suitable AC sources 400 and 402 to respective resolvers 406 and 408. The resolver 406 develops a signal $k_1 \sin \alpha$ and the resolver 408 develops a signal $-k_1 \sin \epsilon$ which are combined in a summer 410 to provide a signal $k_1 [\sin \alpha - \sin \epsilon]$, which signal is applied through an amplifier 412 to a phase sensitive detector 414. A suitable reference signal having the frequency of the $k_1$ signal is applied to the detector 414. In response to a suitable reference phase, the detector 414 develops an envelope signal of a waveform 415 on a lead 416 which is zero when $|\sin \epsilon|$ is greater than the $|\sin \alpha|$ and is a positive voltage for the $|\sin \epsilon|$ being less than $|\sin \alpha|$. In response to the rise of the signal on the lead 416 a one shot multivibrator 418 develops an impact gate pulse of a waveform 417 which may, for example, be 3 milliseconds in width and which is applied to a lead 240. This impact gate pulse is applied through a suitable amplifier and an isolating diode 424 to the jizzle amplifier 376 to increase the gain by about a factor of 4, for example, which causes the impact point to be displayed as a 2° line, four times as wide as a jizzle band. Since the jizzle band is spread out by a factor of 4 at the impact point, it is necessary to increase the intensity proportionally. For that reason the impact gate signal is also applied through an isolating diode 430 to the lead 289 and to the intensity gate amplifier 281 (FIG. 4) to increase the gain by a factor of about 4. Thus, the impact point which is indicated by the flight path reference line 70 is formed by this 2° line applied to the intensity grid 211.

Referring now back to FIG. 8, the aircraft 400 has a longitudinal axis or aircraft ballistic line (ABL) 402 with the velocity vector of a line 404 at an angle $\alpha$ below the line 402, for example. A clearance plane 406 for terrain avoidance operation is maintained horizontal by the gyro stabilizer 115 of FIG. 3 maintaining the antenna 80 horizontal and the display is provided by selecting the A position for the $K_1$ switches by the pilot control 311 of FIG. 5. The antenna then scans at an angle $\epsilon - \phi$ below the horizontal line 407 regardless of the aircraft attitude. For this terrain avoidance operation the display of FIG. 1 remains as shown changing with the aircraft along track position and aircraft elevation angle above the horizontal. For terrain following operation with the switches $K_1$ in the B position, a clearance plane 410 remains parallel to the aircraft ABL line 402 because the gyro stabilizer 115 of FIG. 3 only sets the antenna at a fixed depression angle $\epsilon - \alpha$ below the velocity vector 404. This terrain following display is the same as shown in FIG. 1, with the along track line 20 and the line of sight radar 20 moving rapidly up or down with aircraft attitude changes.

Rferring now principally back to FIGS. 1 and 2, the normal radar video may be applied to the CRT intensity grid during the azimuth antenna scan such that the terrain clearance symbology of the line of sight radar line 80 is superimposed on a radar ground map display. The line of sight range of the indication 80 is provided during an azimuth scan as well as the down look reference line 60 and the terrain clearance reference line 66. During the vertical scan of the antenna, the along track line 20 starts at the point 36 which is the range to the terrain along the maximum down angle and continues to the end of the first segment at the point 40 which is the range along the track to the top of the hill at 42. The start of the second segment 24 at 46 of the along track line is the range to the tangent intercept with the second hill or the range to the point 48. The point 52 is the range along track to the top of the second hill at a point 34 and depending upon the terrain configuration additional segments other than 24 may be provided on the display. The velocity vector of a line 30 shows the impact point if maneuvering is not performed. The clearance plane 26 of FIG. 2 which is shown horizontal and intercepts the first hill will remain horizontal for terrain avoidance operation and will follow the aircraft body line 34 for terrain following operation.

Thus there has been described an along track terrain avoidance contouring system that will provide the pilot with an along track contour from a selected down look angle out to the horizon. Using this technique in conjunction with the known or any suitable azimuth clearance display system provides a substantially improved display and control system.

What is claimed is:

1. An obstacle indicating system for use with an aircraft comprising
radar means including a scanning antenna having a boresight axis,
means to control said antenna to scan in azimuth and in elevation,
signal forming means coupled to said radar means to form a range gate when transmitted energy is received on said boresight axis,
display means having azimuth and elevation deflection controls responsive to said means to control said antenna and said radar means and including an intensity control responsive to said signal forming means to display a radar line-of-sight range,
signal intensifying means coupled to the azimuth deflection control during said vertical scans of said antenna,
circuit means for determining when the antenna boresight axis is coincident with the aircraft velocity vector in elevation and coupled to said signal intensifying means and to said intensity control to develop a flight path reference line on said display, and crab angle correction means coupled to said scanning antenna so that said antenna when scanning in elevation scans along the aircraft velocity vector and said flight path reference line is formed at an angle on said display means representative of said crab angle.

2. An obstacle indicating system for use with an aircraft comprising radar means including a scanning antenna having a boresight axis, means to control said antenna to scan in azimuth and in elevation, signal forming means coupled to said radar means to form a range gate when transmitted energy is received on said boresight axis, display means having azimuth and elevation deflection controls responsive to said means to control said antenna and said radar means and including an intensity control responsive to said signal forming means to display a radar line-of-sight range, signal intensifying means coupled to the azimuth deflection control during said vertical scans of said antenna, circuit means for determining when the antenna boresight axis is coincident with the aircraft velocity vector in elevation and coupled to said signal intensifying means and to said intensity control to develop a flight path reference line on said display, a source of sweep voltages for providing an azimuth and a range sweep voltage for controlling said azimuth and elevation controls, and circuit means for relating a voltage representing a predetermined range to a selected clearance plane below the aircraft to the range sweep voltage and coupled to said intensity control so that at coincidence a down look reference line is formed on said display.

3. A system operable with a moving aircraft to indicate the presence of objects along the path thereof, the system including a scannable monopulse antenna means, radar means for developing a line-of-sight range gate and a display having azimuth and elevation deflection means responsive to the scanning of said antenna and having an intensity control means coupled to said radar means for receiving said line-of-sight range gate comprising antenna control means coupled to said antenna to control said antenna to scan sequentially in azimuth and in elevation, a source of jizzle voltage coupled to the azimuth deflection means of said display and coupled to said antenna control means to apply said jizzle voltage to said azimuth deflection means when said antenna scans in elevation, a terrain clearance reference line circuit for dividing a distance h between the aircraft and a clearance plane below the craft by a function of the radar line-of-sight angle with the clearance plane, for a selected radar down look angle to apply a pulse to the intensity control means of said display during azimuth scan to form a terrain clearance reference line, and means coupled to said terrain clearance reference line circuit and to said antenna to select terrain avoidance or terrain clearance modes of operation.

4. The system of claim 3 further including a down look reference line circuit coupled to said terrain clearance reference line circuit and responsive to the azimuth scanning of said antenna to apply a signal to said intensity control means to provide a down look reference line on said display.

* * * * *